United States Patent
Karakalas

(10) Patent No.: US 12,377,563 B2
(45) Date of Patent: Aug. 5, 2025

(54) RAZOR CARTRIDGE COMPRISING MECHANOCHROMIC LAYER

(71) Applicant: BIC Violex Single Member S.A., Anoixi (GR)

(72) Inventor: Anargyros Karakalas, Anoixi (GR)

(73) Assignee: BIC Violex Single Member S.A., Anoixi (GR)

(*) Notice: Subject to any disclaimer, the term of this patent is extended or adjusted under 35 U.S.C. 154(b) by 182 days.

(21) Appl. No.: 18/488,558

(22) Filed: Oct. 17, 2023

(65) Prior Publication Data
US 2024/0123643 A1   Apr. 18, 2024

(30) Foreign Application Priority Data
Oct. 18, 2022   (EP) .................................. 22202229

(51) Int. Cl.
| | | |
|---|---|---|
| *B26B 21/60* | (2006.01) | |
| *B26B 21/40* | (2006.01) | |
| *B26B 21/56* | (2006.01) | |
| *C09D 5/29* | (2006.01) | |
| *B26B 21/06* | (2006.01) | |
| *B26B 21/22* | (2006.01) | |

(52) U.S. Cl.
CPC .......... *B26B 21/60* (2013.01); *B26B 21/4012* (2013.01); *B26B 21/4068* (2013.01); *B26B 21/565* (2013.01); *C09D 5/29* (2013.01); *B26B 21/06* (2013.01); *B26B 21/225* (2013.01)

(58) Field of Classification Search
CPC . B26B 21/60; B26B 21/4012; B26B 21/4068; B26B 21/565; B26B 21/06; B26B 21/225; C09D 5/29
See application file for complete search history.

(56) References Cited

U.S. PATENT DOCUMENTS

| | | | |
|---|---|---|---|
| 6,295,733 B1 | 10/2001 | Wexler et al. | |
| 9,133,362 B2 * | 9/2015 | Hickenboth | C09D 175/04 |
| 9,528,004 B2 * | 12/2016 | Ribi | C09D 7/41 |
| 9,964,493 B2 | 5/2018 | Yun | |
| 2009/0145347 A1 | 6/2009 | Nakamura et al. | |
| 2010/0122462 A1 | 5/2010 | Ndou et al. | |
| 2013/0340188 A1 | 12/2013 | Patel et al. | |

(Continued)

FOREIGN PATENT DOCUMENTS

| | | |
|---|---|---|
| CN | 111421928 A | 7/2020 |
| CN | 113896925 A | 1/2022 |

(Continued)

OTHER PUBLICATIONS

Colaco et al., 2020, Mechanochromic Microfibers Stabilized by Polymer Blending, https://doi.org/10.1021/acsapm.0c00213.

(Continued)

*Primary Examiner* — Omar Flores Sanchez
(74) *Attorney, Agent, or Firm* — Bookoff McAndrews, PLLC

(57) ABSTRACT

The present disclosure relates to a razor cartridge including a housing having a front edge and a rear edge; at least one razor blade disposed between the front edge and the rear edge; and a mechanochromic layer disposed on the at least one razor blade, wherein the mechanochromic layer comprises a mechanochromic material.

20 Claims, 1 Drawing Sheet

(56) References Cited

U.S. PATENT DOCUMENTS

| | | | |
|---|---|---|---|
| 2014/0275381 A1* | 9/2014 | Ribi | C08J 3/22 |
| | | | 524/549 |
| 2015/0267107 A1 | 9/2015 | Zhu et al. | |
| 2016/0016322 A1* | 1/2016 | Islam | B26B 21/56 |
| | | | 83/13 |
| 2016/0053172 A1 | 2/2016 | Mori et al. | |
| 2018/0230320 A1* | 8/2018 | Chadwick | C09D 127/18 |
| 2019/0142713 A1* | 5/2019 | Ribi | A61Q 1/02 |
| | | | 424/59 |
| 2021/0031388 A1* | 2/2021 | Xu | B26B 21/60 |
| 2021/0031390 A1* | 2/2021 | Skrobis | B26B 21/60 |
| 2021/0163781 A1 | 6/2021 | Retsch, Jr. | |
| 2021/0189170 A1 | 6/2021 | Retsch, Jr. et al. | |
| 2022/0002483 A1 | 1/2022 | Olah et al. | |

FOREIGN PATENT DOCUMENTS

| | | |
|---|---|---|
| EP | 3815861 A1 | 5/2021 |
| JP | 2008136953 A | 6/2008 |
| JP | 2020143175 A | 9/2020 |
| WO | 2015053326 A1 | 4/2015 |
| WO | 2022107522 A1 | 5/2022 |

OTHER PUBLICATIONS

Guo & Zhang, 2021, A review of mechanochromic polymers and composites: From material design strategy to advanced electronics application, https://doi.org/10.1016/j.compositesb.2021.109434.

Jurewicz et al., 2020, Mechanochromic and Thermochromic Sensors Based on Graphene Infused Polymer Opals, https://doi.org/10.1002/adfm.202002473.

Search Report issued in European Application No. 22202229.5. issued on Mar. 16, 2023.

Wang et al., 2018, Rhodamine-Functionalized Mechanochromic and Mechanofluorescent Hydrogels with Enhanced Mechanoresponsive Sensitivity, https://doi.org/10.3390/polym10090994.

* cited by examiner

RAZOR CARTRIDGE COMPRISING MECHANOCHROMIC LAYER

CROSS REFERENCE TO RELATED APPLICATION

This application claims priority from the European Patent Application No. 22202229.5, filed on Oct. 18, 2022, the entire contents of which are being incorporated herein by reference.

TECHNICAL FIELD

The present disclosure relates to the field of shavers. More specifically, the present disclosure relates to razor blades comprising mechanochromic layers.

BACKGROUND

Shavers (also known as safety razors) have a razor cartridge that is permanently or removably attached to a shaver handle which, in use, is oriented in shaving direction. Razor cartridges typically comprise one or more cutting members, each comprising a blade that is perpendicular to the shaving direction. Razor cartridges are also typically provided with a guard (at a leading longitudinal member of the razor cartridge in the shaving direction) and a cap (at a trailing longitudinal member of the razor cartridge in the shaving direction). In use, a user holds the shaver handle in the shaving direction and brings the razor cartridge into contact with a portion of skin defining a shaving plane. In the field of shavers, there are various shaver models available on the market wherein the shaver handles and/or razor cartridges differ in shape, features, aesthetics, color and/or material. On the one hand, there are shavers having a razor cartridge permanently attached to the shaver handle, which may be disposed of when the razor blades are worn out. On the other hand, there are shavers wherein the razor cartridge is removably coupled to the shaver handle such that, when the razor blades are worn out, the razor cartridge can be decoupled, disposed of, and replaced by a new razor cartridge.

During a user's shaving operation (i.e., moving the razor cartridge towards or on a user's skin), shaving debris (e.g., hair, dead skin, shaving foam residue) may lead to the clogging of the razor blades. To unclog the razor blades, a user may rinse the razor cartridge with water, shake the razor cartridge, bang the razor cartridge on random surfaces until the shaving debris is removed, and/or even try to remove the shaving debris with the fingers or other tools like a brush. However, it may be difficult for a user to identify when the razor blades have become clogged.

The present disclosure relates to a razor cartridge allowing improved identification of clogging.

SUMMARY

In a first aspect, the present disclosure relates to a razor cartridge comprising a housing having a front edge and a rear edge; at least one razor blade disposed between the front edge and the rear edge; and a mechanochromic layer disposed on the at least one razor blade, wherein the mechanochromic layer comprises a mechanochromic material.

In some embodiments, the at least one razor blade may be flexible.

In some embodiments, the color change of the mechanochromic layer may be reversible.

In some embodiments, the mechanochromic layer may be configured to change color when the at least one blade is deformed.

In some embodiments, the at least one razor blade may be disposed on a support member configured to attach the at least one razor blade to the razor cartridge, in particular by being inserted into a blade receiving section of the razor cartridge.

In some embodiments, the at least one razor blade may comprise a support section, wherein the support section is configured to attach the at least one razor blade to the razor cartridge, in particular by being inserted into a blade receiving section of the razor cartridge.

In some embodiments, the at least one mechanochromic layer may be configured to face towards the shaved surface when the razor cartridge is used for shaving.

In some embodiments, the razor blade may comprise a cutting-edge, wherein the cutting-edge defines a cutting plane, and wherein the cutting-edge is disposed between the mechanochromic layer and the receiving section.

In some embodiments, the mechanochromic layer may have a thickness between about 1 µm to about 2000 µm, more specifically between about 5 µm to about 400 µm, and in particular between about 10 µm to about 200 µm.

In some embodiments, the mechanochromic material may be configured to change color when exposed to a mechanical stress between about 0.3 MPa to about 3 MPa.

In some embodiments, the mechanochromic material may be configured to change color when exposed to a mechanical force between about 0.1 N to about 5 N, in particular a tensile force.

In some embodiments, the mechanochromic material may comprise a photonic material, a piezophotonic material, a polymer composite with electro/thermo-induced luminescent and chromic substance, a microcrack structure design composite material, a mechanophore, in particular a mechanophore-linked polymer or composite.

In some embodiments, the at least one razor blade may have a thickness between about 0.02 mm to about 0.2 mm, more specifically between about 0.05 mm to about 0.15 mm.

In some embodiments, the at least one razor blade may exhibit a tensile strength between about 500 MPa to about 2000 MPa, more specifically between about 800 MPa to about 1300 MPa.

In some embodiments, the razor cartridge may comprise at least two razor blades, more specifically at least three razor blades and in particular at least 4 razor blades.

In a second aspect, the present disclosure relates to a shaving razor assembly comprising a razor handle and a razor cartridge according to any preceding embodiment, wherein the razor cartridge is either releasably attached to the razor handle via a pivotable or non-pivotable connection, integrally formed with the razor handle via a non-pivotable connection, or integrally formed with the razor handle via a pivotable connection.

In a third aspect, the present disclosure relates to a method for manufacturing a razor cartridge, wherein the method comprises coating at least one razor blade with a mechanochromic layer and assembling the razor blade into a razor cartridge.

In a fourth aspect, the present disclosure relates to a method for manufacturing a razor cartridge, wherein the method comprises assembling a razor cartridge blank comprising at least one razor blade and coating the at least one razor blade with a mechanochromic layer.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting embodiments. Common reference numerals on different Figures indicate like or similar features.

DETAILED DESCRIPTION

Hereinafter, a detailed description will be given of the present disclosure. The terms or words used in the description and the aspects of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

As mentioned above, during a user's shaving operation, shaving debris (e.g., hair, dead skin, shaving foam residue) may clog the razor blades. More specifically, between two adjacent razor blades and between a razor blade and the razor cartridge it is disposed in, there is typically a small gap into which the hairs can enter such that they come into contact with the razor blade's edge. However, these gaps may become clogged, which may reduce the shaving efficiency. To unclog the razor blades, the user may perform different actions such as rinsing the razor cartridge with water or shaking the razor cartridge under water. However, it may be difficult for a user to identify when the razor blades have become clogged, thus when the user should perform such action.

It has been found, that clogging of the razor blades may lead to bending of the razor blades. The shaving debris may accumulate in the gaps to a degree greater than the gap size would allow, bending the razor blades. Additionally, the accumulation of the shaving debris may limit the flexibility of the razor blades. A possibility to visualize mechanical displacement, such as bending, are mechanochromic materials.

The term "mechanochromic material" within this disclosure may i.a. refer to its common meaning in the art. Additionally or alternatively, the term "mechanochromic material" may refer to a material exhibiting mechanochromism. Additionally or alternatively, the term "mechanochromic material" within this disclosure may refer to a material configured to change its colour based on a change of the mechanochromic material's geometry. Additionally or alternatively, the term "mechanochromic material" may refer to a material configured to change its color based on a mechanical stress and/or strain within the mechanochromic material. Additionally or alternatively, the term "mechanochromic material" may refer to a material configured to change its color based on a mechanical-stress and/or strain induced change in molecular structure, intermolecular interaction, or formation and/or change of photonic and/or morphological structures.

Figure 1:
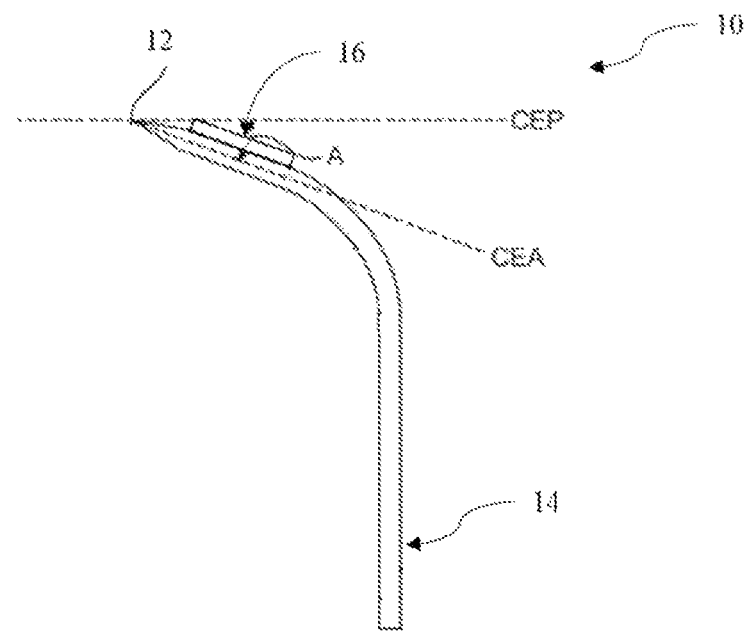
FIG. 1 shows a schematic side view of a razor blade 10 comprising a mechanochromic layer 14.
Figure 2:
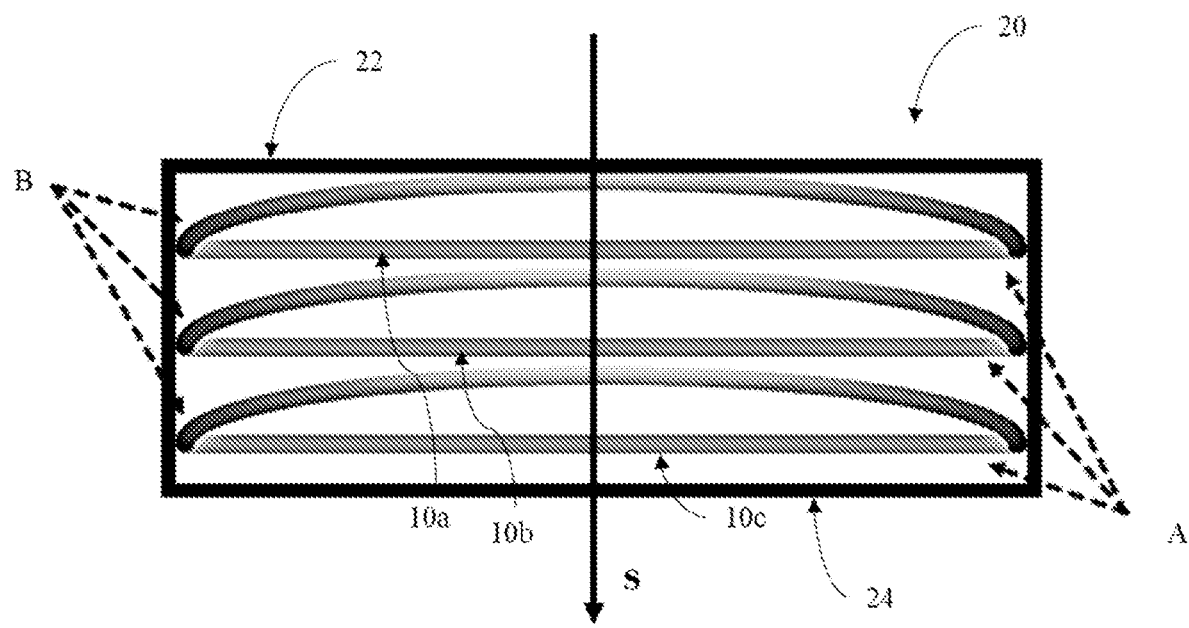
FIG. 2 shows a schematic top-view of three razor blade 10a, 10b, 10c in an unbent state (A) and a bent state (B).

Accordingly, in a first aspect and by making reference to FIGS. 1 and 2, the present disclosure relates to a razor cartridge 20 comprising a housing having a front edge 24 and a rear edge 22; at least one razor blade 10 disposed between the front edge 24 and the rear edge 22; and a mechanochromic layer 16 disposed on the at least one razor blade 10, wherein the mechanochromic layer 16 comprises a mechanochromic material.

FIG. 1 shows an exemplary razor blade 10 according to the first aspect. The razor blade 10 comprises a cutting-edge 12. Further the razor blade 10 comprises a support section 14. The support section 14 may be configured to attach the at least one razor blade 10 to the razor cartridge 20, in particular by being inserted into a blade receiving section of the razor cartridge 20. Alternatively, the at least one razor blade 10 may be disposed on a support member configured to attach the at least one razor blade 10 to the razor cartridge 20, in particular by being inserted into a blade receiving section of the razor cartridge 20. In some embodiments, the support member may be a plastic, metal or resin support member upon which a razor blade comprising a cutting-edge is welded.

The cutting edges 12 of adjacent razor blades 10 define a cutting-edge plane (CEP). If only one razor blade 10 is disposed within the razor cartridge 20, the cutting-edge plane (CEP) may be defined by the cutting-edge 12 and the front edge 24 and rear edge 22. FIG. 1 further shows the "cutting edge angle" CEA, the bisecting angle of the cutting-edge angle. The cutting-edge angle is the angle formed by the tapered end of a blade or cutting member intended for cutting hair. The shaving angle A defines the angle of declination of the cutting-edge angle CEA and the CEP or the shaving plane.

As depicted in FIG. 1, the at least one mechanochromic layer 16 may be configured to face towards the shaved surface when used for shaving.

The shaving angle A defines the angle of declination of the cutting-edge angle CEA and the CEP or the shaving plane. The cutting-edge angle CEA may be disposed between the mechanochromic layer 16 and the support section 14 as depicted in FIG. 1.

FIG. 2 shows a schematic top view of three razor blades 10a, 10b, 10c, disposed in a razor cartridge 20 with a front edge 24 and rear edge 22. The shaving direction S is also shown in FIG. 2. The razor blades marked by A are unbent, prior to being clogged by shaving debris. When the razor blade 10a, 10b, 10c are used for shaving, they may become clogged and thereby bent as depicted by the razor blades marked with "B". In particular, the razor blades 10a, 10b, 10c may be bent against the shaving direction S. As a result, the mechanochromic layer 16 may change color, visualizing the clogging to the user. Hence, the mechanochromic layer 16 may be configured to change color when the at least one blade is deformed.

In some embodiments, the color change of the mechanochromic layer 16 may be reversible. Hence the mechanochromic layer 16 may return to its initial (original) color when the at least one razor blade 10's deflection has been reduced, indicating to the user that sufficient shaving debris has been removed. Furthermore, the reversibility of the color change enables the user to identify when the at least one razor blade has been clogged again.

The mechanochromic layer 16 may also visualize the accumulation of shaving debris due to the reduction of flexibility of the at least one razor blade 10. When the razor cartridge 20 is unclogged the at least one razor blade 10 may bend to a greater degree during the shaving action compared to when the razor cartridge 20 is clogged. As mentioned above, mechanochromic layer 16 may return to its original color when the at least one razor blade 10 returns to a non-deformed shape. However, the reversion of the mechanochromic layer 16 to its original (initial) color may exhibit a time delay (hysteresis). In some embodiments, the at least one razor blade 10 may appear red if allowed to fully flex during the shaving action and appear orange if the razor cartridge 20 is clogged. As a result, when the razor cartridge 20 is not clogged the at least one razor blade 10 may exhibit a different color immediately after shaving compared to when the razor cartridge 20 is clogged, allowing the user to identify when the razor cartridge 20 needs to be unclogged.

Razor blades 10 are commonly made of metal and hence are usually flexible. Accordingly, the at least one razor blade 10 may be flexible. In some embodiments, the at least one razor blade 10 may exhibit a tensile strength between about 500 MPa to about 2000 MPa, more specifically between about 800 MPa to about 1300 MPa. The at least one razor blade 10 may have a thickness between about 0.02 mm to about 0.2 mm, more specifically between about 0.05 mm to about 0.15 mm.

In some embodiments, the mechanochromic layer 16 may have a thickness between about 1 μm to about 2000 μm, more specifically between about 5 μm to about 400 μm, and in particular between about 10 μm to about 200 μm.

In some embodiments, the mechanochromic material may be configured to change color when exposed to a mechanical stress between about 0.3 MPa to about 3 MPa. In some embodiments, the mechanochromic material may be configured to change color when exposed to a mechanical force between about 0.1 N to about 5 N, in particular a tensile force.

In some embodiments, the mechanochromic material may comprise a photonic material, a piezophotonic material, a polymer composite with electro/thermo-induced luminescent and chromic substance, a microcrack structure design composite material, a mechanophore, in particular a mechanophore-linked polymer or composite.

The term "mechanophore" within this disclosure may i.a. refer to its common meaning in the art. Additionally or alternatively, the term "mechanophore" may relate to a molecule or molecular unit configured to change its color when exposed to stress or strain. Mechanophores may be in particular inserted or cross-linked into polymers or materials comprising polymers. The mechanophore may be configured to undergo a ring-opening under mechanical stress, more specifically a reversible ring-opening under mechanical stress and in particular to transform from a ring-closed form, in a particular a spirocyclic form, to a ring-opened form under mechanical stress. The mechanophores may exhibit a first color or no color when in the ring-closed form and a second color when in the ring-opened form.

In some embodiments, the mechanochromic material may comprise mechanochromic fibers, in particular mechanochromic polymer fibers. In some embodiments, the mechanochromic fibers may comprise a spiropyran-functionalized polymer, in particular spiropyran-functionalized poly(methyl acrylate). The durability of the mechanochromic fibers may be improved by blending the spiropyran-functionalized polymer with another polymer, for example poly(methyl methacrylate). The spiropyran may act as a mechanophore and the polymer may be configured to transfer stress to the spiropyran.

Mechanochromic fibers are for example described in "Coleco et al., 2020, Mechanochromic Microfibers Stabilized by Polymer Blending, https://doi.org/10.1021/acsapm.0c00213", which is incorporated herein by reference.

In some embodiments, the mechanochromic material may comprise a mechanochromic polymer, more specifically a mechanochromic polymer comprising a rhodamine and in particular a mechanochromic rhodamine spirolactam micellar hydrogel. Rhodamines, in particular rhodamine spirolactams, may occur in a ring-closed form and a ring-opened form. The ring opening of some rhodamines, in particular rhodamine spirolactams may be force-induced, in particular stress-induced, hence rhodamine spirolactam may be a mechanophore. The polymer may transfer forces, in particular stress, to the rhodamine. In particular, the hydrogel may transfer forces into the micelles, wherein the micelles comprise rhodamine spirolactam. In some embodiments, the micelles may be formed of tween 80. The micelles may comprise an acrylate polymer. In particular, the acrylate polymer may cross-link the rhodamine within the micelles. In some embodiments, the hydrogel may be formed of an acrylamide polymer, and in particular the micelles may be cross-linked by the acrylamide polymer. When mechanical stress is applied to the hydrogel, the stress may be transferred to the micelles via the acrylate polymer. The micelles may deform due to the induced stress, leading to stress induced upon the acrylate polymer. The force induced on the acrylate polymer may be transferred to the rhodamines due to the cross-links between the rhodamines and the acrylate polymer, leading to a transformation of the rhodamine from the ring-closed state to the ring-opened state. Synthesis of a rhodamine spirolactam hydrogel is described in "Wang et al., 2018, Rhodamine-Functionalized Mechanochromic and Mechanofluorescent Hydrogels with Enhanced Mechanoresponsive Sensitivity, https://doi.org/10.3390/polym10090994", which is herein incorporated by reference.

In some embodiments, the mechanochromic material may comprise particles, in particular the particles may be spheres. More specifically the spheres may be polymer spheres and in particular the polymer spheres may comprise a copolymer of methyl methacrylate, butyl acrylate and methacrylic acid. In some embodiments, the particles may have a size between about 100 nm to about 400 nm, more specifically between about 200 nm to about 300 nm. In some embodiments, the mechanochromic material may comprise a latex. In particular, the particles described above may be present in the latex. The term "latex" within this disclosure may refer to emulsions of a polymer in a fluid, more specifically to an emulsion of polymer particles in water, and in particular an emulsion of polymer microparticles in water. The latex may be an elastic solid or a gel. More specifically the latex may comprise the polymer spheres and in particular the latex may comprise the polymer spheres and graphene. The graphene may be present in the form of graphene flakes comprising multiple layers of graphene. In some embodiments, the graphene may be exfoliated graphene flakes. In some embodiments, the graphene may have a size between about 150 nm to about 500 nm, more specifically between about 300 nm to about 400 nm in its greatest expansion. The latex may have a water content between about 1 wt.-% to about 30 wt.-%, more specifically between about 5 wt.-% to about 15 wt.-% and in particular between about 8 wt.-% to about 12 wt.-%, relative to the total weight of the latex. The latex may have undergone water evaporation to form a microstructure of colloidal crystals. The colloidal crystals may be formed of the polymer particles and may be enhanced by the graphene. The graphene may be trapped in the latex at the interstitial spaces between polymer particles and improve the assembly of the particles into colloidal crystals. The graphene may be replaced by graphene oxide. The term "colloidal crystal" within this disclosure may refer to an ordered array of colloid particles. The particles, in particular the polymer spheres, may be the colloid particles.

The latex, in particular the colloidal crystals, may form a photonic material, in particular photonic crystals.

The term "photonic crystal" within this disclosure i.a. refers to its common meaning in the art. Additionally or alternatively the term "photonic crystal" may refer to a plurality of layers affecting the motion of light (photons), in particular a plurality of layers affecting the motion of light (photons) exhibiting a periodicity. Additionally or alternatively the term "photonic crystal" may refer to a plurality of layers having a photonic band-gap in at least one dimension.

Without wishing to be bound by theory, the photonic crystals may affect the motion of photons, in particular crystals may affect the motion of photons by exhibiting a photonic band-gap. The photonic band-gap allows light with a wavelength outside the photonic band-gap range to propagate through the plurality of layers, while light with a wavelength in the range of the photonic band-gap range cannot propagate. For light to be diffracted, the periodicity of a plurality of layers must correspond approximately to half of the wavelength of the light to be diffracted. The aforementioned layers may be formed by the aforementioned particles, in particular polymer spheres, wherein the particles are arranged to form a repeating structure, in particular a repeating layer structure. The photonic band-gap may therefore depend upon the periodicity of the layers or particles. When stress is induced into the latex, the distance between the particles, in particular the layers formed by the particles may change, in particular increase, which may change the photonic band gap, which again may change the color displayed by the latex. In some embodiments, the mechanochromic material may have a graphene content between about 0.001 wt.-% to about 0.1 wt.-%, more specifically between about 0.005 to about 0.02 wt.-% relative to the total weight of the polymer spheres.

A mechanochromic material comprising a latex comprising graphene is described in "Jurewicz et al., 2020, Mechanochromic and Thermochromic Sensors Based on Graphene Infused Polymer Opals, https://doi.org/10.1002/adfm.202002473", which is incorporated herein by reference.

The following mechanochromic materials may also form photonic crystals. The mechanochromic material may comprise silica particles and poly(ethylene glycol) phenyl ether acrylate rubber. The silica particles may be the particles described above. Alternatively or additionally, the mechanochromic material may comprise poly(butyl acrylate) spheres, 2-ethylhexyl acrylate and a polyacrylic acid hydrogel. The poly(butyl acrylate) spheres may be the polymer spheres referred to above. Additionally or alternatively, the mechanochromic material may comprise polystyrene spheres, at least one aligned carbon nanotubes sheet and PDMS fibers. The polystyrene spheres may be the polymer spheres mentioned above.

Alternative mechanochromic materials comprise spiropyran polycarbonate, diarylbenzofuranone, 1,2-dioxetanes, 1,3,6,8-tetraphenylpyrene derivative assemblies, naphtopyran crosslinkers covalently incorporated into silicone elastomers, phenylene vinylene oligomeric derivatives, e.g. fluorescent cyano-containing poly[(m-phenylene ethynylene)-alt-(p-phenylene ethynylene)] derivatives or mechanochromic metal-organic compounds.

Additionally, mechanochromic materials are for example described in "Guo & Zhang, 2021, A review of mechanochromic polymers and composites: From material design strategy to advanced electronics application, https://doi.org/10.1016/j.compositesb.2021.109434", which is incorporated herein by reference.

In some embodiments, the razor cartridge 20 may comprise at least two razor blades, more specifically at least three razor blades and in particular at least 4 razor blades. When the razor cartridge comprises a plurality of razor blades, not all razor blades need to comprise the mechanochromic layer 16. In some embodiments, in case a razor cartridge 20 comprises three razor blades, only one razor blade 10 may comprise the mechanochromic layer 16 and the two other razor blades may not comprise the mechanochromic layer 16. Alternatively, two razor blades 10 of the three razor blades may comprise the mechanochromic layer 16 or all three razor blades 10 may comprise the mechanochromic layer 16.

In a second aspect, the present disclosure relates to a shaving razor assembly comprising a razor handle and a razor cartridge 20 according to any preceding embodiment, wherein the razor cartridge 20 is either releasably attached to the razor handle via a pivotable or non-pivotable connection, integrally formed with the razor handle via a non-pivotable connection, or integrally formed with the razor handle via a pivotable connection.

In a third aspect, the present disclosure relates to a method for manufacturing a razor cartridge 20, wherein the method comprises coating at least one razor blade with a mechanochromic layer 16 and assembling the razor blade into a razor cartridge 20.

In a fourth aspect, the present disclosure relates to a method for manufacturing a razor cartridge 20, wherein the method comprises assembling a razor cartridge 20 blank comprising at least one razor blade and coating the at least one razor blade with a mechanochromic layer.

In some embodiments, the mechanochromic layer is as described above.

As mentioned above, not all razor blades in the razor cartridge 20 must comprise the mechanochromic layer 16.

Although the present disclosure is defined in the attached claims, it should be understood that the present disclosure can also (alternatively) be defined in accordance with the following aspects:

1. A razor cartridge (20) comprising:
   a housing having a front edge (24) and a rear edge (22),
   at least one razor blade (10) disposed between the front edge (24) and the rear edge (22), and
   a mechanochromic layer (16) disposed on the at least one razor blade (10), wherein the mechanochromic layer (16) comprises a mechanochromic material.
2. The razor cartridge (20) according to aspect 1, wherein the at least one razor blade (10) is flexible.
3. The razor cartridge (20) according to any preceding aspect, wherein the color change of the mechanochromic layer (16) is reversible.
4. The razor cartridge (20) according to any preceding aspect, wherein the mechanochromic layer (16) is configured to change color when the at least one blade (10) is deformed.
5. The razor cartridge (20) according to any preceding aspect, wherein the at least one razor blade is disposed on a support member configured to attach the at least one razor blade to the razor cartridge (20), in particular by being inserted into a blade receiving section of the razor cartridge (20); or,
   wherein the at least one razor blade (10) comprises a support section (14), wherein the support section (14) is configured to attach the at least one razor blade (10) to the razor cartridge (20), in particular by being inserted into a blade receiving section of the razor cartridge (20).

6. The razor cartridge (20) according to any preceding aspect, wherein the at least one mechanochromic layer (16) is configured to face towards the shaved surface when used for shaving; or
   wherein the razor blade (10) comprises a cutting-edge, wherein the cutting-edge defines a cutting-edge angle (CEA), and wherein the cutting-edge angle (CEA) is disposed between the mechanochromic layer (16) and the support section (14).
7. The razor cartridge (20) according to any preceding aspect, wherein the mechanochromic-layer (16) has a thickness between about 1 μm to about 2000 μm, more specifically between about 5 μm to about 400 μm, and in particular between about 10 μm to about 200 μm.
8. The razor cartridge (20) according to any preceding aspect, wherein the mechanochromic material is configured to change color when exposed to a mechanical stress between about 0.3 MPa to about 3 MPa.
9. The razor cartridge (20) according to any preceding aspect, wherein the mechanochromic material is configured to change color when exposed to a mechanical force between about 0.1 N to about 5 N, in particular a tensile force.
10. The razor cartridge (20) according to any preceding aspect, wherein the mechanochromic material comprises a photonic material, a piezophotonic material, a polymer composite with electro/thermo-induced luminescent and chromic substance, a microcrack structure design composite material, a mechanophore, in particular a mechanophore-linked polymer or composite.
11. The razor cartridge (20) according to any preceding aspect, wherein the at least one razor blade (10) has a thickness between about 0.02 mm to about 0.2 mm, more specifically between about 0.05 mm to about 0.15 mm.
12. The razor cartridge (20) according to any preceding aspect, wherein the at least one razor blade (10) exhibits a tensile strength between about 500 MPa to about 2000 MPa, more specifically between about 800 MPa to about 1300 MPa.
13. The razor cartridge (20) according to any preceding aspect, wherein the razor cartridge (20) comprises at least two razor blades (10), more specifically at least three razor blades (10) and in particular at least 4 razor blades (10).
14. A shaving razor assembly comprising:
   a razor handle, and
   a razor cartridge according to any preceding aspect, wherein the razor cartridge is either releasably attached to the razor handle via a pivotable or non-pivotable connection, integrally formed with the razor handle via a non-pivotable connection, or integrally formed with the razor handle via a pivotable connection.
15. A method for manufacturing a razor cartridge, wherein the method comprises coating at least one razor blade with a mechanochromic layer and assembling the razor blade into a razor cartridge; or,
   assembling a razor cartridge blank comprising at least one razor blade and coating the at least one razor blade with a mechanochromic layer.

The invention claimed is:
1. A razor cartridge comprising:
   a housing having a front edge and a rear edge,
   at least one razor blade disposed between the front edge and the rear edge, and
   a mechanochromic layer disposed on the at least one razor blade, wherein the mechanochromic layer comprises a mechanochromic material.
2. The razor cartridge according to claim 1, wherein the at least one razor blade is flexible.
3. The razor cartridge according to claim 1, wherein the color change of the mechanochromic layer is reversible.
4. The razor cartridge according to claim 1, wherein the mechanochromic layer is configured to change color when the at least one blade is deformed.
5. The razor cartridge according to claim 1, wherein the at least one razor blade is disposed on a support member configured to attach the at least one razor blade to the razor cartridge; or,
   wherein the at least one razor blade comprises a support section, wherein the support section is configured to attach the at least one razor blade to the razor cartridge.
6. The razor cartridge according to claim 1, wherein the at least one razor blade is disposed on a support member configured to attach the at least one razor blade to the razor cartridge by being inserted into a blade receiving section of the razor cartridge; or
   wherein the at least one razor blade comprises a support section, wherein the support section is configured to attach the at least one razor blade to the razor cartridge by being inserted into a blade receiving section of the razor cartridge.
7. The razor cartridge according to claim 1, wherein the at least one mechanochromic layer is configured to face towards the shaved surface when used for shaving; or
   wherein the razor blade comprises a cutting-edge, wherein the cutting-edge defines a cutting-edge-angle, and wherein the cutting-edge angle is disposed between the mechanochromic layer and the support section.
8. The razor cartridge according to claim 1, wherein the mechanochromic layer has a thickness between about 1 μm to about 2000 μm.
9. The razor cartridge according to claim 1, wherein the mechanochromic layer has a thickness between about 5 μm to about 400 μm.
10. The razor cartridge according to claim 1, wherein the mechanochromic material is configured to change color when exposed to a mechanical stress between about 0.3 MPa to about 3 MPa.
11. The razor cartridge according to claim 1, wherein the mechanochromic material is configured to change color when exposed to a mechanical force between about 0.1 N to about 5 N.
12. The razor cartridge according to claim 11, wherein the mechanical force is a tensile force.
13. The razor cartridge according to claim 1, wherein the mechanochromic material comprises a photonic material, a piezophotonic material, a polymer composite with electro/thermo-induced luminescent and chromic substance, a microcrack structure design composite material, a mechanophore or mixtures thereof.
14. The razor cartridge according to claim 1, wherein the mechanochromic material comprises a mechanophore-linked polymer or composite.
15. The razor cartridge according to claim 1, wherein the at least one razor blade has a thickness between about 0.02 mm to about 0.2 mm.
16. The razor cartridge according to claim 1, wherein the at least one razor blade exhibits a tensile strength between about 500 MPa to about 2000 MPa.

17. The razor cartridge according to claim 1, wherein the at least one razor blade exhibits a tensile strength between about 800 MPa to about 1300 MPa.

18. The razor cartridge according to claim 1, wherein the razor cartridge comprises at least two razor blades.

19. A shaving razor assembly comprising:
  a razor handle, and
  a razor cartridge according to claim 1, wherein the razor cartridge is either releasably attached to the razor handle via a pivotable or non-pivotable connection, integrally formed with the razor handle via a non-pivotable connection, or integrally formed with the razor handle via a pivotable connection.

20. A method for manufacturing a razor cartridge, wherein the method comprises coating at least one razor blade with a mechanochromic layer and assembling the razor blade into a razor cartridge; or,
  assembling a razor cartridge blank comprising at least one razor blade and coating the at least one razor blade with a mechanochromic layer.

* * * * *